United States Patent [19]

Spanner

[11] Patent Number: 5,500,734
[45] Date of Patent: Mar. 19, 1996

[54] PHOTOELECTRIC POSITION MEASURING SYSTEM WITH INTEGRAL OPTICAL CIRCUIT HAVING PHASE SHIFTED INTERFERENCE GRATINGS

[75] Inventor: Erwin Spanner, Traunstein, Germany

[73] Assignee: Dr. Johannes Heidenhain GmbH, Traunreut, Germany

[21] Appl. No.: 246,306

[22] Filed: May 19, 1994

[30] Foreign Application Priority Data

May 21, 1993 [EP] European Pat. Off. ............ 93108246

[51] Int. Cl.$^6$ .......................... G01B 11/02; G02B 6/00
[52] U.S. Cl. .................. 356/356; 356/363; 250/237 G; 385/12; 385/14
[58] Field of Search ............................ 356/354–358, 356/363; 385/12, 14

[56] References Cited

U.S. PATENT DOCUMENTS

| | | | |
|---|---|---|---|
| 4,717,255 | 1/1988 | Ulbers | 356/358 |
| 4,744,661 | 5/1988 | Ulbers et al. | 356/358 |
| 4,923,300 | 5/1990 | Michel et al. | 356/356 |
| 4,938,595 | 7/1990 | Parrjaux et al. | 356/356 |
| 4,955,718 | 9/1990 | Michel | 356/356 |
| 5,127,733 | 7/1992 | Allgäuer | 356/356 |
| 5,187,545 | 2/1993 | Allgäuer | 356/356 |
| 5,214,280 | 5/1993 | Rieder et al. | 250/237 G |

FOREIGN PATENT DOCUMENTS

| | | |
|---|---|---|
| 0276395 | 8/1988 | European Pat. Off. . |
| 0434855 | 7/1991 | European Pat. Off. . |
| 0509716 | 10/1992 | European Pat. Off. . |
| 0509979 | 10/1992 | European Pat. Off. . |
| 3630887 | 10/1987 | Germany . |
| 3705653 | 7/1988 | Germany . |

*Primary Examiner*—Frank Gonzalez
*Assistant Examiner*—Jason D. Eisenberg
*Attorney, Agent, or Firm*—Willian Brinks Hofer Gilson & Lione

[57] ABSTRACT

An integrated optical interferometer is provided having a substrate located on one object and a measuring reflector or measuring diffraction grating located on another object. A beam impinging upon the substrate is split into two partial beams by a coupling grating and is coupled into a beam waveguide and supplied to another coupling grating. A second partial beam is routed by the measuring reflector to the second coupling grating and there interferes with the first partial beam. The second coupling grating is divided into a plurality of gratings which are phase-shifted with respect to each other so that signals that are phase-shifted with respect to each other can be generated by a plurality of detectors.

20 Claims, 2 Drawing Sheets

PHOTOELECTRIC POSITION MEASURING SYSTEM WITH INTEGRAL OPTICAL CIRCUIT HAVING PHASE SHIFTED INTERFERENCE GRATINGS

FIELD OF THE INVENTION

The invention relates to a photoelectric measuring system for measuring the position of two objects relative to each other.

BACKGROUND OF THE INVENTION

German Patent Publication DE-C2 36 30 887 describes a position measuring system in the form of an interferometer using integrated optics construction. A substrate arrangement is described having a waveguide for the measuring beam, a laser connected at one end of the waveguide and a decoupling or coupling grating located at the other end of the waveguide. A so-called reference waveguide is obtained from the measuring waveguide by use of a coupler. A mirrored edge of the substrate terminates the reference waveguide and this forms a mirror for the reference waveguide. A disadvantage associated with such a system is that it is not easy to produce mirrors or Bragg reflectors in an integrated optical device. Also, systems requiring lenses also have problems in manufacture and adjustment.

SUMMARY OF THE INVENTION

According to a first aspect of the present invention, a position measuring system for measuring the position of a first object relative to a second object is provided. A first grating for diffracting a beam of light into a first and second diffracted partial beam is provided. A substrate having a waveguide formed in a plane of the substrate includes a second grating communicating with the waveguide and a third grating spatially separated from the second grating also communicating with the waveguide. The third grating includes a plurality of partial gratings which are offset with reference to each other in the measuring direction. The first diffracted partial beam is coupled into the waveguide by the second grating and supplied to the third grating and the second diffracted partial beam is coupled into the waveguide by the third grating where it is brought into interference with the first diffracted partial beam. A plurality of detectors communicating with the waveguide converts the interfering first and second partial beams into phase-shifted electrical signals.

According to a second aspect of the present invention, a method of measuring the position of a first object relative to a second object is provided. A substrate is located on the first object, the substrate having a waveguide and a plurality of detectors. Also, an interference grating having a plurality of partial gratings offset with respect to one another communicates with the waveguide. A beam of light is diffracted into a first and second diffracted partial beam. The first and second diffracted beams are coupled into the waveguide where they are brought into interference in the interference grating. The interfering beams are detected by the detectors and converted into phase-shifted electrical signals.

It is an object of the present invention to provide a position measuring system which is simply constructed and requires little adjustment effort. In addition, a system that can be easily adapted to specific requirements and whose operation is secure against interference.

An advantage of the position measuring system of the present invention is that it is possible to combine passive elements on a substrate into an interferometric position measuring system in integrated optical construction within the smallest possible space. Another advantage is the elimination of reflectors and/or lenses on the chip. Only the measuring reflector or the scale grating on the object to be measured is still required to be disposed outside of the substrate.

The invention itself, together with objects and attendant advantages, will best be understood by reference to the following detailed description taken in conjunction with accompanying drawings. It should be understood, however, that this description is to be illustrative rather than limiting, the scope of the invention being defined by the appended claims and equivalents thereof.

DETAILED DESCRIPTION OF THE PRESENTLY PREFERRED EMBODIMENTS

To clearly illustrate the integrated optics of the preferred embodiments of the present invention, the integrated optics are shown greatly exaggerated and often even distorted so as to illustrate essential details.

Figure 1A:
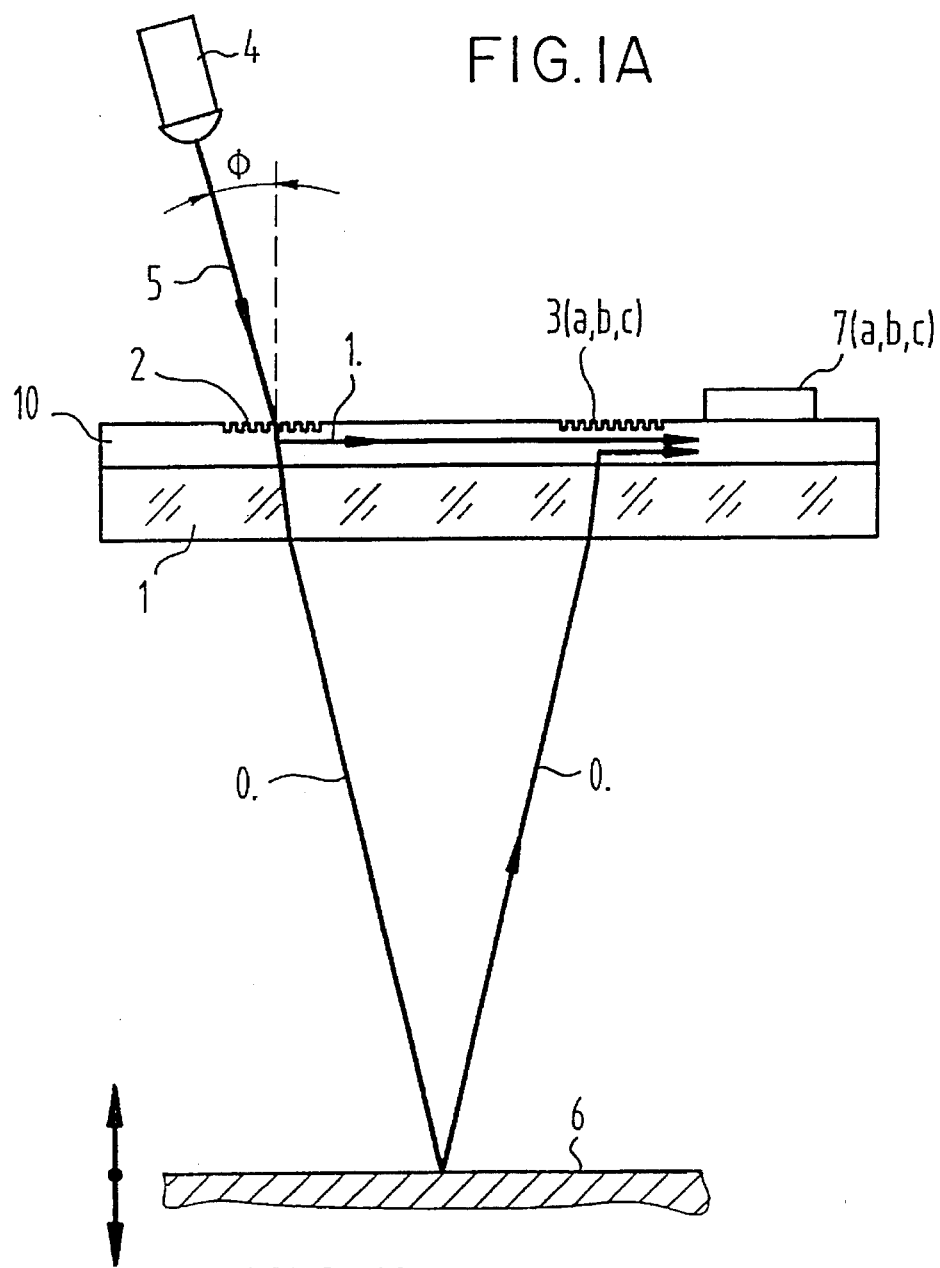
FIG. 1A illustrates an integrated optical interferometer with coupling gratings and a measuring reflector according to a first preferred embodiment of the present invention.
Figure 1B:
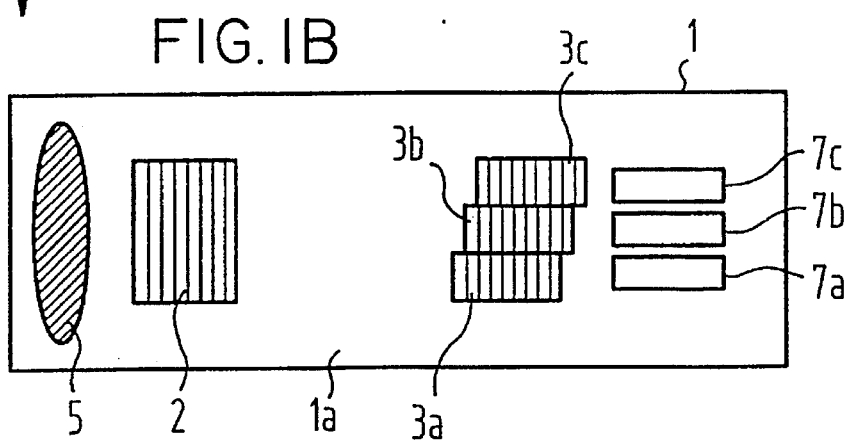
FIG. 1B illustrates a top view of the substrate of FIG. 1A.

FIGS. 1A and 1B illustrates an integrated optical interferometer according to a first preferred embodiment of the present invention. The measuring device includes a substrate 1 and a measuring reflector 6. In a preferred embodiment the substrate 1 is located on a first object and the measuring reflector 6 is located on a second object, the first and second objects being movable with respect to one another as indicated by the arrow. A planar beam waveguide 1a extends in or on the surface of the substrate 1. Two coupling gratings 2 and 3 are formed on the surface of the substrate 1 and a plurality of detectors 7a, 7b and 7c are provided on the surface of the substrate 1.

A light source, preferably a laser diode 4, directs a beam 5 onto coupling grating 2. Coupling grating 2 acts not only as a coupler but also as a beam splitter. The beam 5 impinges upon coupling grating 2 at an angle $\Phi$ and is split in such a way that the partial beam of the 0th order impinges on the measuring reflector 6, which preferably is in the form of a plane mirror 6. The partial beam of the 1st order is diffracted and coupled into the planar beam waveguide 1a in the form of a guided mode. The partial beam impinging upon reflector 6 is reflected back towards the substrate 1.

Coupling grating 3 includes three partial areas 3a, 3b and 3c. Coupling grating 3 acts not only as a coupler but also as an interference grating to bring the partial beam traveling in the waveguide 1a and the partial beam reflected from reflector 6 into interference. The detectors 7a, 7b and 7c are connected downstream of interference coupling gratings 3a, 3b and 3c.

The partial beam with the component of the 1st order, diffracted in the coupling grating 2 and supplied to the interference coupling grating 3 and detectors 7a to 7c, constitutes the reference arm of the interferometer. The partial beam with the component of the 0th order, guided via the measuring reflector 6 to impinge upon the interference coupling grating 3 from where it is directed to the detectors 7a to 7c, constitutes the measuring arm of the interferometer.

The partial beams forming the measuring arm 0. and the reference arm 1. interfere below the interference coupling grating 3. Due to the use of a three-part interference coupling grating 3a, 3b and 3c; three signals, which are phase-shifted with respect to each other, are generated in the detectors 7a, 7b, and 7c. As can be seen in the top view of FIG. 1B of the substrate, the three partial areas 3a, 3b and 3c of the interference coupling grating 3 are phase-shifted in the measuring direction with respect to each other, so that, for example, three signals, phase-shifted by 120° with respect to each other, are detected by the detectors 7a, 7b and 7c. The processing of the three signals is well known in the art and is described in U.S. Pat. No. 4,538,595 (Parriaux), for example, whose contents are incorporated herein by reference.

The detected signals are created by the modulation of the interfered partial beams when the distance between the plane mirror 6 and the substrate 1 is changed. If the plane mirror 6 is disposed parallel to the substrate 1, the grating constants of the coupling grating 2 and the interference coupling grating 3 can be selected to be the same.

So that the reference beam 1. coupled in at the angle Φ is not completely decoupled at the interference coupling grating 3, its coupling length should be greater than the diameter of the beam 5 in the coupling direction. FIG. 1B shows the outline of beam 5 as it is directed to the substrate 1.

Because the point of impingement of the measuring beam 0. at the interference coupling grating 3 is displaced when the distance between the plane mirror 6 and the substrate 1 changes, the operational range of the interferometer is correspondingly limited.

Figure 2:
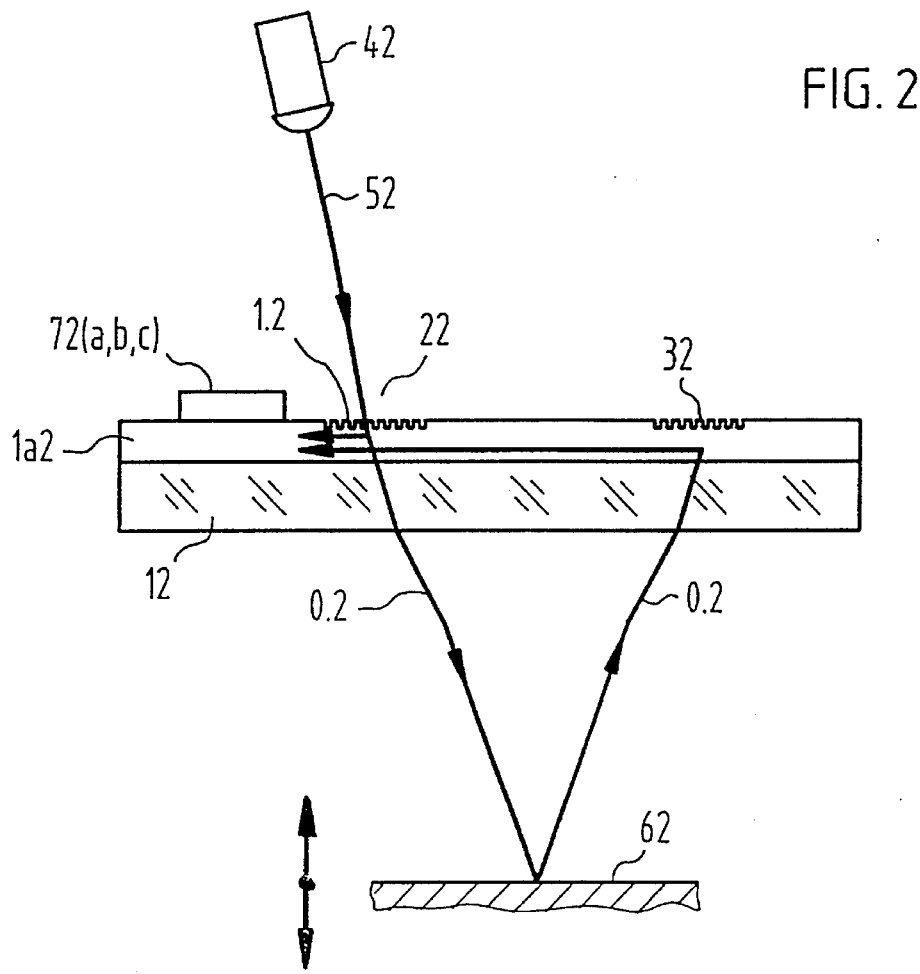
FIG. 2 illustrates an integrated optical interferometer according to a second preferred embodiment of the present invention.

FIG. 2 illustrates an integrated optical interferometer according to a second preferred embodiment of the present invention. Similar elements and features are given the same reference numerals as in FIG. 1 with the addition of an index representing the figure number.

With an appropriate layout of the coupling grating 22 and with the acute angle of incidence of the beam 52 adapted thereto, the splitting of the beam into partial beams and the interference of the partial beams takes place in the same coupling grating 22. To accomplish this, a coupling grating 32 for deflection of the partial beam is necessary. Either grating 22 or grating 32 is divided into partial gratings as previously described with reference to FIG. 1. Furthermore, one of ordinary skill would understand that the interfering partial beams are detected by detectors 72a, 72b, 72c and processed as described previously with respect to detectors 7a, 7b and 7c of FIG. 1.

Figure 3:
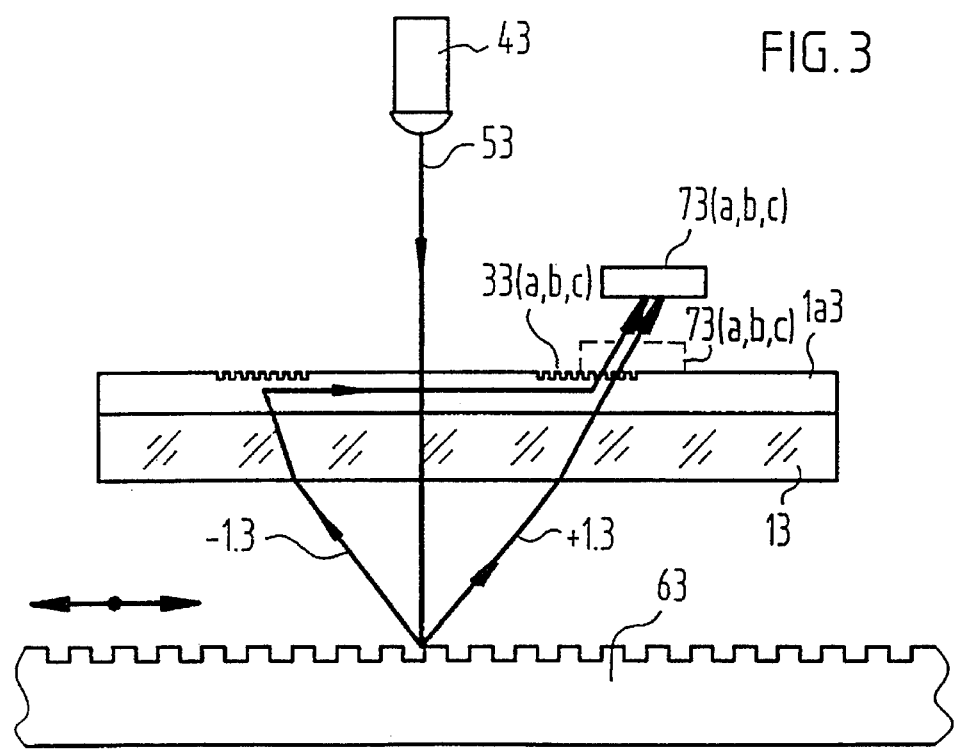
FIG. 3 illustrates an integrated optical interferometer according to a third preferred embodiment of the present invention.

FIG. 3 illustrates an integrated optical interferometer according to a third preferred embodiment of the present invention. Instead of using a reflector in the form of a mirror mounted on the second object for measuring relative displacements between the first and second objects as in FIGS. 1 and 2, a reflecting grating scale 63 is mounted on the second object.

A beam 53 emitted preferably by a laser diode 43 passes through a waveguide 1a3 disposed on a substrate 13 and impinges on the grating scale 63. Two partial beams +1.3 and −1.3 are generated by diffraction at the grating scale 63 and are reflected onto the substrate 13. Two coupling gratings 23 and 33 are located on the substrate 13 or in the waveguide 1a3, wherein the coupling grating 33 consists of three partial gratings 33a, 33b and 33c, similar to FIG. 1.

The partial beam −1.3 is deflected with the aid of the coupling grating 23 and coupled into the waveguide 1a3 and brought to the coupling grating 33. The partial beam +1.3 is deflected by the coupling grating 33 or its partial gratings 33a, 33b and 33c and is also coupled into the waveguide 1a3. Here the partial beams +1.3 and −1.3 interfere in the course of which the three partial areas of the partial beam +1.3 experience a relative phase shift, so that three phase-shifted electrical signals can be generated by the detectors 73a, 73b and 73c located above partial gratings 33a, 33b and 33c. One of ordinary skill would understand how to process the three phase shifted signals as described previously with respect to the embodiment of FIG. 1.

As shown in FIG. 3, the detectors can be disposed next to as well as on the coupling gratings. In addition, placement of the detectors at the front end of the substrate is also possible.

It is understood that the division of the appropriate coupling gratings is not limited to three partial gratings. It is also possible to have only two partial gratings or, alternatively, four or more gratings, depending upon the number of phase-shifted signals to be generated. It is left to one skilled in the art which of the coupling gratings is to be divided into phase-shifted partial gratings.

While the preferred embodiments have been described with reference to reflected light measuring systems, the present invention may also be used in transmitted light measuring systems.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A position measuring system for measuring with position of a first object relative to a second object comprising:
   a first grating for diffracting a beam of light into a first and second diffracted partial beam; and
   a substrate comprising:
      a waveguide formed in a plane of the substrate;
      a second grating communicating with the waveguide;
      a third grating spatially separated from the second grating, communicating with the waveguide, the third grating including a plurality of partial gratings which are offset with reference to each other in with measuring direction,
   wherein the first diffracted partial beam is coupled into the waveguide by the second grating and supplied to the third grating and the second diffracted beam is coupled into the waveguide by the third grating where it is brought into interference with the first diffracted partial beam; and
   a plurality of detectors communicating with the waveguide, the detectors converting the interfering first and second diffracted partial beams into phase-shifted electrical signals.

2. A position measuring system according to claim 1 wherein the first and second gratings comprise one grating.

3. A position measuring system according to claim 2 wherein the first and third gratings have identical grating constants.

4. A position measuring system according to claim 2 further including a reflector located on the second object for reflecting the second diffracted partial beam onto the third grating.

5. A position measuring system according to claim 2 wherein the first and third gratings have different grating constants.

6. A position measuring system according to claim 1 wherein the first and third gratings comprise one grating.

7. A position measuring system according to claim 6 wherein the second and third gratings have different grating constants.

8. A position measuring system according to claim 6 wherein the second and third gratings have identical grating constants.

9. A position measuring system according to claim 1 wherein the first grating is spatially separate from the substrate.

10. A position measuring system according to claim 11 wherein the first grating is a reflecting grating.

11. A position measuring system according to claim 9 wherein the first grating can be moved in a plane parallel to the substrate to modulate the interfering first and second diffracted partial beams.

12. A position measuring system according to claim 1 wherein the first grating is a diffracting grating.

13. A position measuring system according to claim 1 wherein the beam of light is provided by a laser diode.

14. A position measuring system according to claim 1 wherein the plurality of detectors are disposed on the third grating.

15. A position measuring system according to claim 1 wherein the plurality of detectors are disposed next to the third grating.

16. A position measuring system according to claim 1 wherein the plurality of detectors are located at one end of the substrate.

17. A method of measuring a position of a first object relative to a second object comprising the steps of:
   providing a diffraction grating for diffracting a beam of light into a first and second diffracted partial beam;
   providing a substrate located on the first object having a waveguide and a plurality of detectors;
   providing a first grating located on the substrate, the first grating communicating with the waveguide;
   providing an interference grating on the substrate spatially separated from the first grating, the interference grating communicating with the waveguide and having a plurality of partial gratings offset with respect to one another;
   diffracting a beam of light into a first and a second diffracted partial beam with the diffraction grating;
   coupling the first diffracted partial beam into the waveguide with the first grating;
   coupling the second diffracted partial beam into the waveguide with the interference grating;
   interfering the first and second diffracted partial beams coupled to the waveguide in the interference grating; and
   detecting the interference with the detectors to convert the first and second interfering diffracted partial beams into phase-shifted electrical signals.

18. A method of measuring according to claim 17 wherein the diffraction grating is located on the second object.

19. A method according to claim 17 wherein the diffraction and first gratings are used to both diffract the beam of light into said first and second diffracted partial beams and couple the first diffracted partial beam into the waveguide.

20. A method according to claim 17 wherein the first diffracted partial beam is reflected by a reflector located on the second object before being coupled into the waveguide.

* * * * *

UNITED STATES PATENT AND TRADEMARK OFFICE
CERTIFICATE OF CORRECTION

PATENT NO. : 5,500,734
DATED : March 19, 1996
INVENTOR(S) : Erwin Spanner

It is certified that error appears in the above-indentified patent and that said Letters Patent is hereby corrected as shown below:

<u>On the Title Page</u> Item [30]

In column 1, line 11, under "Foreign Application Priority Data", delete "93108246" and substitute --93108246.5--.

<u>In the Claims</u>

In claim 1, line 1, delete "with" and substitute --a--.

In claim 1, line 11, delete the second occurrence of "with" and substitute --a--.

In claim 10, line 1, delete "11" and substitute --1--.

Signed and Sealed this

Twenty-second Day of July, 1997

Attest:

BRUCE LEHMAN

Attesting Officer  Commissioner of Patents and Trademarks